United States Patent

Ogawa et al.

[15] 3,693,645
[45] Sept. 26, 1972

[54] MANUAL-AUTOMATIC CHANGE-OVER DEVICE FOR PNEUMATIC CONTROLLER

[72] Inventors: Shinichiro Ogawa, Fujisawa; Ryuhei Fukuda, Yokohama, both of Japan

[73] Assignee: Honeywell Inc., Fort Washington, Pa.

[22] Filed: June 9, 1971

[21] Appl. No.: 151,246

[52] U.S. Cl. ....................... 137/86, 137/DIG. .001
[51] Int. Cl. ......................... F15b 3/14, G05d 16/00
[58] Field of Search ............... 137/86, 85, DIG. .001

[56] References Cited

UNITED STATES PATENTS 2,747,595   5/1956   Dickey ............ 137/DIG. .001

*Primary Examiner*—Alan Cohan
*Attorney*—Arthur H. Swanson and Lockwod D. Burton

[57] ABSTRACT

In a manual operation, the output pressure of an inverse proportion pressure converter provided in a second feedback circuit acts against a back pressure detected by a nozzle and a balancing element. This output pressure is applied to a resetting pressure receiving chamber to balance a feedback pressure receiving chamber which receives a manually operating pressure directly.

1 Claim, 4 Drawing Figures

MANUAL-AUTOMATIC CHANGE-OVER DEVICE FOR PNEUMATIC CONTROLLER

BACKGROUND OF THE INVENTION

This invention relates to a manual-automatic change-over device for a pneumatic controller, and more particularly to such a change-over device, which is bumplessly switchable or no variation is produced in the output pressure even if deviation exists between the controlled amount and the set value in changing onto manual state.

In a prior pneumatic controller, when both the manual and automatic operations are carried out, the output of a controller part is made to follow a manual pressure to match to the manual pressure during the manual operation, whereby no variation will take place when changing-over from manual to automatic is performed.

SUMMARY OF THE INVENTION

In this invention, a nozzle is provided to detect the displacement of a balancing beam at a manual state to give a back pressure in accordance with the displacement, an inverse proportion pressure converter is provided to produce a reversely acting pressure to the back pressure, the reversed pressure is applied through a second feedback path to a resetting pressure receiving chamber, and a feedback pressure receiving chamber for receiving a manually operating pressure is mounted on a balancing beam against the resetting pressure receiving pressure chamber to balance to the beam.

In changing-over from manual to automatic, the pressure in the resetting chamber immediately before change-over is stored in the second feedback path, the displacement of the beam is detected after the change-over, the pneumatic pressure corresponding to the displacement is fedback to the pressure receiving chamber through the first feedback path to balance the beam.

It is an object of this invention to provide a manual-automatic change-over device with bumpless variation in the output pressure irrespective of existence of any deviation between the controlled amount and the set value.

DESCRIPTION OF THE PREFERRED EMBODIMENT

Figure 1:
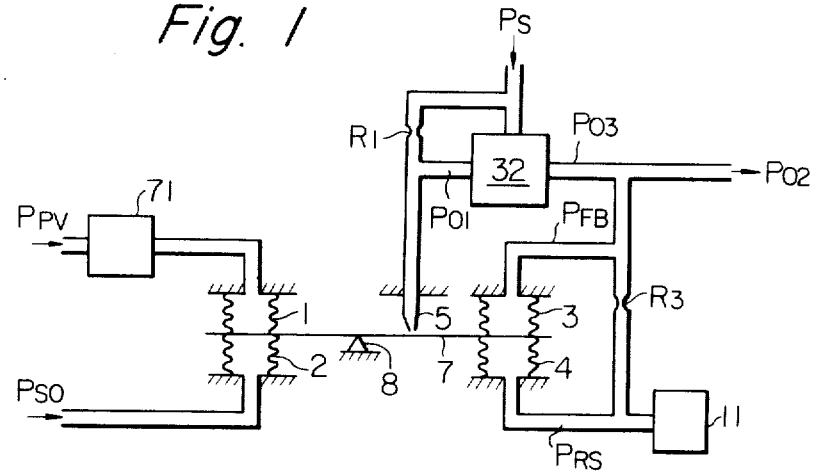
FIGS. 1 and 2 are schematic representation of prior art of pneumatic controller having change-over device for explanation thereof.
Figure 2:
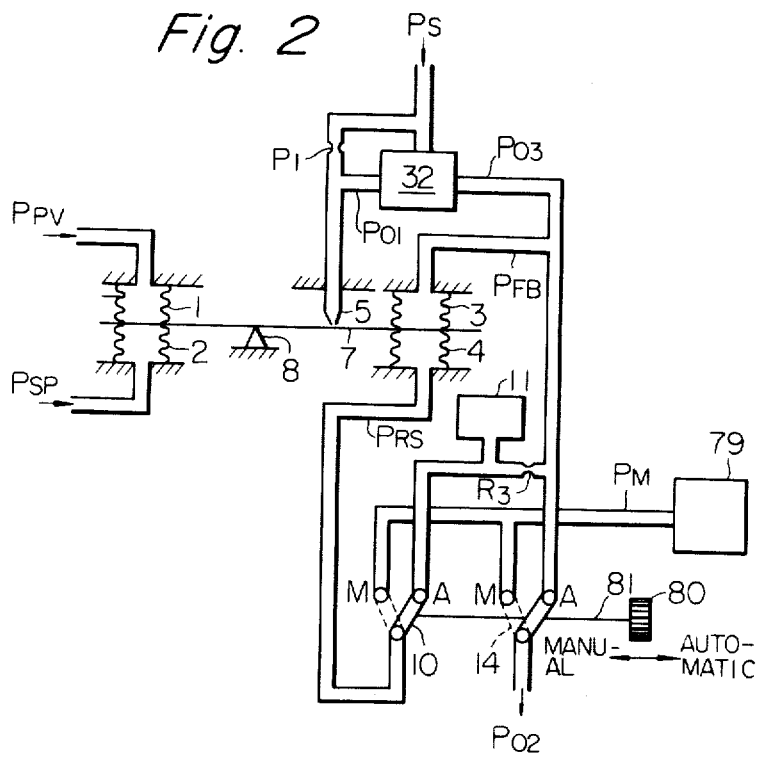

The general construction of the priorly known type of the pneumatic controller having integrating operation is, as shown in FIG. 1, comprised of:

PV - controlled amount,
SP - set value,
$P_{02}$ - output pressure of controller,
$P_{FB}$ - feeding back pressure,
$P_{RS}$ - integrating operation pressure, (reset pressure)
1, 2, 3 and 4 - pressure receiving parts such as bellows,
7 - balancing part such as beam,
8 - fulcrum of beam,
5 - detector part such as nozzle and flapper,
32 - amplifier part such as pilot valve,
$R_3$ - integrating throttle,
11 - integrating capacitor,
7 - differentiating unit (may be inserted into feedback path, if necessary),
$P_S$ - pressure to be supplied to amplifier part and detector part,
$R_1$ - throttle for detector part,
$P_{01}$ - back pressure at detector part,
$P_{03}$ - pressure amplified at amplifier part, In a pneumatic controller as above, if both manual and automatic operations be carried out, the output of the controller part is made to follow the manual pressure to match thereto during the manual operation, whereby no variation will take place when changing-over from manual to automatic is performed. FIG. 2 shows an example for such an assembly as above.

As shown in FIG. 2, pneumatic automatic-manual change-over switches 10 and 14 are transferred onto automatic side (A) for automatic state, an output pressure $P_{03}$ is fed back through a first feedback path to feedback pressure receiving chamber 3 or bellows 3 as a feedback pressure $P_{FB}$, while it is brought out through switch 14 as an output pressure $P_{02}$ for the controller. The output pressure $P_{03}$ is transmitted through a second beedback path consisting of an integrating throttle $R_3$ and an integrating capacitor 11 to a resetting pressure receiving chamber 4 or bellows 4 as a resetting pressure $P_{RS}$. An input pressure $P_{PV}$ as a controlled amount is applied to a first input pressure receiving chamber 1 or bellows 1, and a set pressure $P_{SP}$ as a set value is applied a second input pressure receiving chamber 2 or bellows 2. Thus the automatic output $P_{02}$ corresponding to the input deviation ($P_{PV} - P_{SP}$) will go out as a controller output.

In manual state, pneumatic automatic-manual change-over switches 10 and 14 are transferred onto manual side (M) as shown in broken lines in the drawing, and the manual operating pressure $P_M$ of a manual operator 79 will go out as the output pressure $P_{02}$ of the controller, and it will be applied directly to reset pressure receiving chamber 4. If there be no deviation or $P_{PV} = P_{SP}$, then a flapper beam 7 acting as a balancing element will be displaced in accordance with the input pressure $P_{RS}$ applied onto resetting pressure receiving chamber 4. This displacement will be detected by means of nozzle 5 to produce a back pressure $P_{01}$ corresponding thereto. The pressure $P_{01}$ is amplified by a pneumatic amplifier 32 to become a pressure $P_{03}$ and is fed back to feedback pressure receiving chamber 3 as a pressure $P_{FB}$. Beam 7 will thus be balanced, and the pressure $P_{FB}$ or $P_{03}$ will follow the pressure $P_{RS}$. In manual state, as the pressure $P_{RS}$ is the manual operating pressure $P_M$ itself, the output pressure $P_{03}$ of the amplifier 32 will, with no deviation existing, follow the manual pressure $P_M$ to make $P_{03} = P_M$, so that the changing-over from manual to automatic may be done bumplessly.

However, if there be any deviation at manual state, the output pressure $P_{03}$ will follow not only the manual operating pressure $P_M$, but it will become an amount corresponding to a sum or difference of the deviation between those applied onto flapper beam 7 acting as a balancing element and the manual operating pressure $P_M$. In other words, if $P_{PV} \neq P_{SP}$, then $P_{03} \neq P_M$, and if change-over is done from manual to automatic in the above state, there will be produced a bumping corresponding to the difference between $P_{03}$ and $P_M$ in the output $P_{02}$ of the controller, no bumpless change-over being expected.

Figure 3:
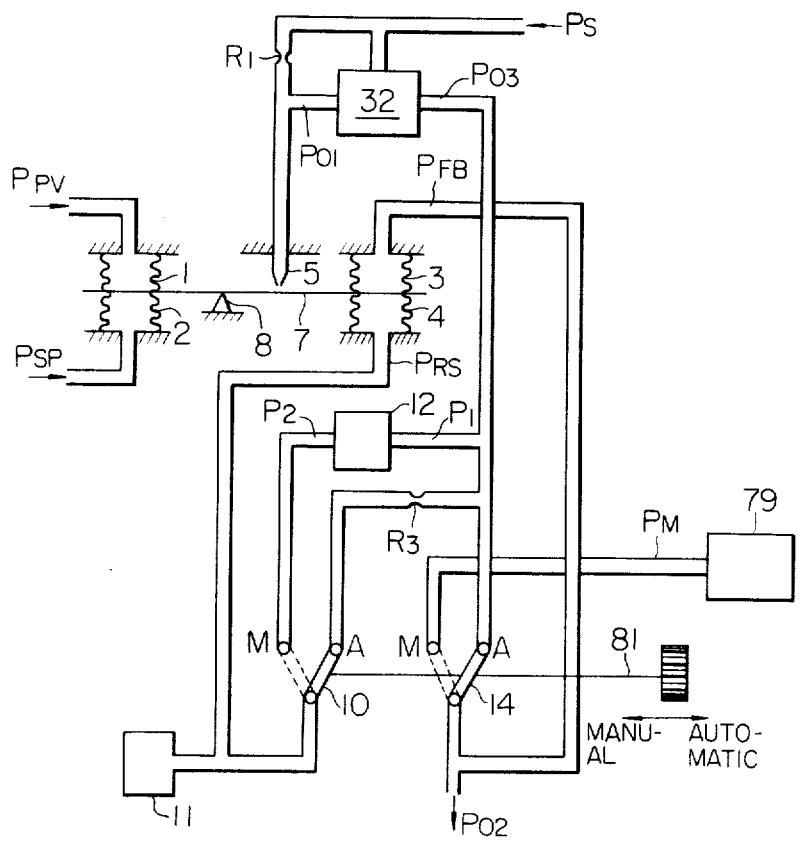
FIG. 3 is a schematic representation of an embodical example of the manual-automatic change-over device for pneumatic controller according to this invention.

In an embodiment of this invention shown in FIG. 3, operations in automatic state will substantially be similar to the conventional system or that shown in FIG. 2. In manual state, however, besides the operating pressure $P_M$ from the manual operator itself becomes the output pressure $P_{02}$ of the controller, the pressure $P_M$ will also be applied through change-over switch 14 and the first feedback path to bellows 3. On the other hand, the back pressure $P_{01}$ of nozzle 5 or the detector is amplified through amplifier 32, the output of which is switched-over onto the second feedback path through switch 10, and is applied onto bellows 4, into which flowing path is inserted a reverse pressure transformer 12, which is connnected to be insertable at manual state.

Figure 4:
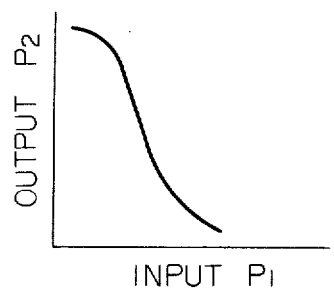
FIG. 4 is a characteristic curve of a reverse pressure transformer usable in the embodiment of FIG. 3.

An inverse proportion pressure converter 12 is provided with an adequate function that an increased output $P_1$ will produce a decreased output $P_2$ therethrough as shown in FIG. 4. If this transformer is inserted into the circuit as shown in FIG. 3, where no deviation is existing or $P_{PV} = P_{SP}$ in manual state, the flapper beam 7 will be displaced by an input of manual pressure $P_M$. That is to say, the manual pressure $P_M$ will be applied through switch 14 having been switched onto M side to bellows 3 as $P_{FB}$, the displacement of flapper beam 7 thereby produced will be detected by nozzle 5 to produce the back pressure $P_{01}$, and amplifier 32 having the input $P_{01}$ will produce the output pressure $P_{03}$, which is the input $P_1$ to converter 12, of which the output is $P_2$. The output $P_2$ is applied to bellows 4 as a feedback pressure $P_{RS}$. As the relation of the pressures $P_1$ and $P_2$ is graphically shown in FIG. 4, the resetting pressure impressed on bellows 4 such that the displacement of beam 7 due to increased $P_M$ will be cancelled, whereby beam 7 will keep a balanced state, and accordingly, switching from manual to automatic may be done bumplessly.

On the other hand, if there be a deviation due to $P_{PV} \neq P_{SP}$ in the circuit, beam 7 will be displaced in proportion to the sum or difference of the deviation ($P_{PV} - P_{SP}$) and the manual pressure $P_M$. If the deviation which tends to turn beam 7 counter clockwise be 0.6 Kg/cm² and the manual pressure $P_M$, which tends to turn beam 7 clockwise be 1.0 Kg/cm², then beam 7 will be acted by a force $P_M - (P_{PV} - P_{SP}) = 0.4$ Kg/cm², which tends to turn it clockwise. Then the nozzle will produce the back pressure $P_{01}$ corresponding to the deviation pressure 0.4 Kg/cm², which back pressure $P_{01}$ is fedback through amplifier 32 and transformer 12 to resetting pressure receiving chamber 4 as the resetting pressure $P_{RS}$ to thereby make beam 7 to be balanced. Therefore, if there be a deviation, the pressure $P_{02}$ or the manual pressure $P_M$ is not equal to the resetting pressure $P_{RS}$. However, by processing as hereinafter described, a bumpless change-over from manual to automatic may be done even if under the condition $P_M \neq P_{RS}$. That is to say, if a change-over from manual to automatic be done in the above state, the resetting pressure $P_{RS}$ (= 0.4 Kg/cm²) may be stored into the second feedback path by means of the high resistive integrating throttle $R_3$, and beam 7 will be acted counter clockwise by the deviation $P_{PV} - P_{SP}$ (= 0.6 Kg/cm² ), and also by the resetting pressure $P_{RS}$ (= 0.4 Kg/cm²) which has been stored, so that beam 7 will make a turning displacement in counter clockwise direction by the sum (1.0 Kg/cm²) of the above two pressures, so that detector part 5 will detect this displacement to produce the back pressure $P_{01}$. This back pressure $P_{01}$ will be amplified through amplifier 32 to become $P_{03}$, which pressure will be fedback through switch 14 now on A side to feedback pressure receiving chamber 3, and the pressure $P_{03}$ will become at length to be equal to a pressure 1.0 Kg/cm² now acting on beam 7, which will then become to be balanced. That is to say, the very pressure going out from the controller as the output $P_{02}$ is nothing but the output pressure $P_{03}$, which is the output of pneumatic amplifier 32, and this pressure will become as stated above to be equal to the manual pressure $P_M$ immediately before changing-over, so that a bumpless change-over from manual to automatic may be realized.

As stated above, nozzle 5 is adapted to detect the displacement of balancing beam 7 at manual state to attain a back pressure in accordance with the displacement, an inverse proportion pressure converter is adapted to produce a reversely acting pressure to the back pressure, the reversed pressure is applied through the second feedback path to resetting pressure receiving chamber 4, against which a feedback pressure receiving chamber 3 for receiving directly the manually operating pressure $P_M$ is oppositely mounted on the balancing beam, which will thereby be balanced. In changing-over from manual to automatic, the pressure in resetting chamber 4 immediately before changing-over is further kept in memory in the second feedback path, so that the position of beam 7 immediately after changing-over is detected as it is then by nozzle 5, the pneumatic pressure corresponding to the displacement will be fedback directly through the first feedback path, but not through the second feedback as in prior to the changing-over, to pressure receiving chamber 3. And chamber 3 is made to oppose to pressure receiving chamber 4, wherein is continuing the state of the second feedback path, to make beam 7 to be rebalanced. therefore, changing-over from manual to automatic may be done bumplessly no matter whether the deviation is existing or not.

We claim:

1. Manual-automatic change-over device for a pneumatic controller, which is comprised of the combination of a pneumatic controller, a manual operating device, and manual-automatic change-over switch, wherein a balancing element is provided to be swingable around a fulcrum, one arm side of said element is adapted to be applied with controlled amount and set amount oppositely to each other, the displacement of said balancing element is detected by a first detector at automatic state, and a first output proportioned to said displacement is applied to said balancing element at the other arm side thereof through a first feedback path as a first feedback pressure, the first output is further applied through a second feedback path including an integrating circuit to said balancing beam as a second feedback pressure in opposition to the first feedback pressure to thereby make the balancing element to be balanced, characterized by that the change-over switch is adapted to be switchable so as to make the manual operating pressure at manual state to become the controller output pressure and the first feedback pressure, and a reverse pressure transformer is further provided, which is switchable at manual state into the second feedback path, and the balancing element is adapted to be kept to be balanced by said first feedback pressure and said second feedback pressure, whereby changing-over from manual to automatic may be done bumplessly even with deviation existing.

* * * * *